United States Patent [19]
Mann

[11] Patent Number: 6,110,088
[45] Date of Patent: Aug. 29, 2000

[54] INTEGRATED TRANSPORT SYSTEM

[76] Inventor: Stephan Mann, 1900 SW. Hartley, Gresham, Oreg. 97080

[21] Appl. No.: 09/027,502

[22] Filed: Feb. 20, 1998

Related U.S. Application Data

[63] Continuation of application No. 08/722,470, Sep. 27, 1996.
[51] Int. Cl.[7] ...................................................... B41F 13/56
[52] U.S. Cl. ........................................... 493/188; 271/3.18
[58] Field of Search ..................................... 271/3.18, 3.2, 271/3.21, 4.06, 202, 270; 198/592; 493/188

[56] References Cited

U.S. PATENT DOCUMENTS 5,026,340   6/1991   Thompson ........................... 493/245 X

*Primary Examiner*—David A. Scherbel
*Assistant Examiner*—Anthony Ojini
*Attorney, Agent, or Firm*—Keith A. Cushing

[57] ABSTRACT

A integrated transport system includes automated mass mailing material handling. An infeed accepts material directly the output of a folder, applies an address to each article, and outputs the addressed articles on a collection table. Because the infeed is adaptable across a variety of configurations, the integrated transport system receives a flow of mass mailing material from a variety of heights and machine sources. Overall, the present invention facilitates more automated, more accurate, and more productive manipulation and handling of mass mailing material in preparation for submission to the postal service.

6 Claims, 2 Drawing Sheets

INTEGRATED TRANSPORT SYSTEM

RELATED APPLICATIONS

The present application is a continuation of U.S. patent application Ser. No. 08/722,470 filed Sep. 27, 1996 by the inventor of the present application and entitled Improved Infeed System for a Mailer.

BACKGROUND OF THE INVENTION

The present invention relates generally to methods and apparatus for material handling and particularly to automated handling of mass mailing material.

Mass mailing material, e.g., advertising, brochures, catalogs, and the like, traditionally undergo several steps in preparation for submission to the postal service for delivery as mail to addressed individuals. The process begins by printing information or content on flat stock, perhaps on each side of flat stock. Once printed, the flat stock material is typically folded one or more times.

Printing and folding can occur at a trade bindery or at separate locations. In any case, an inventory of printed, folded material accumulates. The inventory of printed, folded material is then typically transported to a separate location, i.e., to a mailer, where an address is applied to each article of material and the material is presorted into trays by zip code for delivery to the postal system as presorted mail.

Upon receiving a batch of printed, folded material, the mailer, i.e., one who applies addresses, operates a mailer station. The mailer station typically requires three workers during operation. The first worker breaks down a batch, i.e., unloads a pallet, of printed, folded material and feeds the material into the mailer station. The mailer station receives a source of address data and applies an address by printer to each article of material. The mailer station outputs addressed articles onto a collection table whereat the second worker sorts the addressed material according to zip code. The third worker places the material into trays for delivery to the postal system.

In some cases, the process of folding printed flat stock and the process of applying addresses thereto occurs at the same location. Under such system, the output of a folder collects or accumulates an inventory of folded material, e.g., a substantial quantity stacked in a receptacle or on a pallet. As each receptacle of folded material fills, it may be temporarily stored or taken directly to a mailer station. At the mailer station, three workers operate the mailer station as described above.

The subject matter of the present invention improves handling of mass mailing material by reducing the number of people required for operation, increasing automated handling, and thereby increasing overall productivity.

SUMMARY OF THE INVENTION

The present invention provides an integrated transport system coupling to a material source providing a high-speed flow of mailing material. An infeed conveyor receives the flow of mailing material and moves the material to an outfeed. The outflow of material goes to a collection conveyor for sorting and collection manually in trays. According to one aspect of the invention, the material source is a folder providing folded sheet material. According to another aspect of the present invention, the infeed pivots at a proximal end thereof to adjust the height of a distal end thereof to a selected height matching the material flow provided by the material source. The integrated transport system thereby adapts in height to receive the flow of mailing material from the material source. In accordance with yet another aspect of the present invention, the system is adaptable, when necessary, to rotate the mailing material as delivered in the outflow.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

Figure 1:
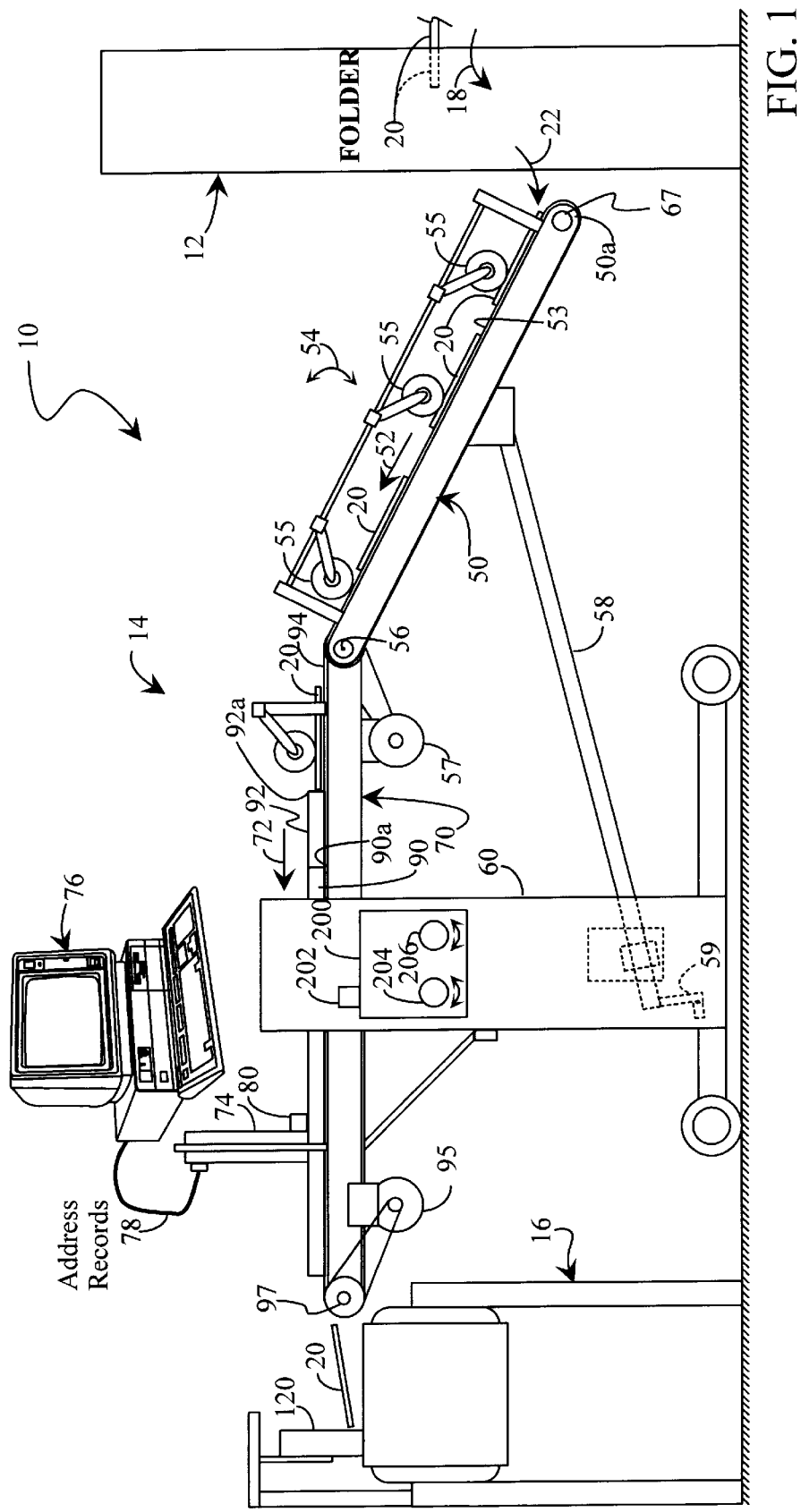
FIG. 1 is a side view of an integrated transport system according to a preferred embodiment of the present invention including a folder, a transport station, and a collection table.

The preferred embodiment and use of the invention as illustrated in the drawings comprises generally a method and apparatus for preparing material for mailing, e.g. mass mailing material.

FIG. 1 illustrates an integrated transport system 10 constructed and operated in accordance with a preferred form of the present invention. In FIG. 1, a folder 12 (illustrated schematically in FIG. 1) feeds a transport station 14 which in turn feeds a collection conveyor 16. Folder 12 operates in conventional fashion receiving a flow 18 of flat stock material 20 (shown partially in FIG. 1) and providing as output a flow 22 of folded material 20 at a given height relative to floor level. Folder 12 thereby serves as a material source for station 14. Station 14, however, is adaptable to receive material from a variety of sources. More particularly, station 14 receives a material flow at a selected, i.e., adjustable, height.

Transport station 14 includes a tilting infeed table 50 receiving flow 22 and moving folded material 20 along infeed table 50 as the flow 52. A set of conveyor belts 53 of table 50 move material 20 along path 52 while a set of stabilizing rollers 55 hold material 20 against conveyor belts 53. Conveyor belts 53 are driven by an electric motor 57. A drive shaft 61 lies concentric to axis 56 and couples to motor 57 via drive belt 63. Each of conveyor belts 53 couple to drive shaft 61 via drive blocks 65 mounted on drive shaft 61. In this manner, infeed table 50 pivots about drive shaft 61 and drive shaft 61 moves belts 53 at a speed corresponding to the speed of operation for electric motor 57. At the distal end 51a of table 50 an idler shaft 67 mounts rotatably upon table 50 and blocks 69 carried on shaft 67 support conveyor belts 53. As may be appreciated, the location of blocks 65 and 69 along the length of shafts 61 and 67, respectively, may be adjusted to laterally position the conveyor belts 53 on infeed table 50.

Infeed table 50 pivots as indicated at reference numeral 54 about an axis 56. Screw 58 couples base 60 of station 14 and the undersurface of infeed table 50. Rotation of screw 58, by means of handle 59, pivots table 50 as indicated to a selected inclination. In this manner, the distal end 50a of infeed table 50 adjusts suitably in height to receive a flow of material, e.g., adjusted to the height of flow 22 as provided by folder 12.

Flow 52 of folded material 20 continues toward axis 56 and eventually arrives on horizontal table 70. As may be appreciated, the height of horizontal table 70 is a standard work level height, and may additionally be adjusted in height in conventional fashion (not shown) by manipulation of base 60. Conveyor belts 94 of horizontal table 70 move folded material 20 along a path 72 past a printer 74. An electric motor 95 drives belts 94. A drive shaft 97 mounts rotatably to the distal end 70a of table 70 and couples via belt 99 to electric motor 95. Drive blocks 101 attach to drive shaft 97 and propel conveyor belts 94. At the proximal end 70b of table 70, i.e., at the axis 56, conveyor belts 94 of table 70 are carried upon bearings 103 mounted upon drive shaft 61. In this manner, the speed of conveyor belts 94 is independent of the speed of conveyor belts 53, i.e., the drive shaft 61 only rotationally supports conveyor belts 94 and does not drive belts 94 by virtue of the bearings 103 intermediate each belt 94 and the drive shaft 61.

Printer 74 couples to a data source 76 providing a sequence of address records 78 to printer 74. As one of folded materials 20 passes printer 74, a sensor 80 triggers printer 74 to apply a next one in the sequence of address records 78 as on address 100. In this manner, a mailing list provided by data source 76 as address records 78 is applied to a batch of folded material 20 for submission to the postal system as addressed mail.

Figure 2:
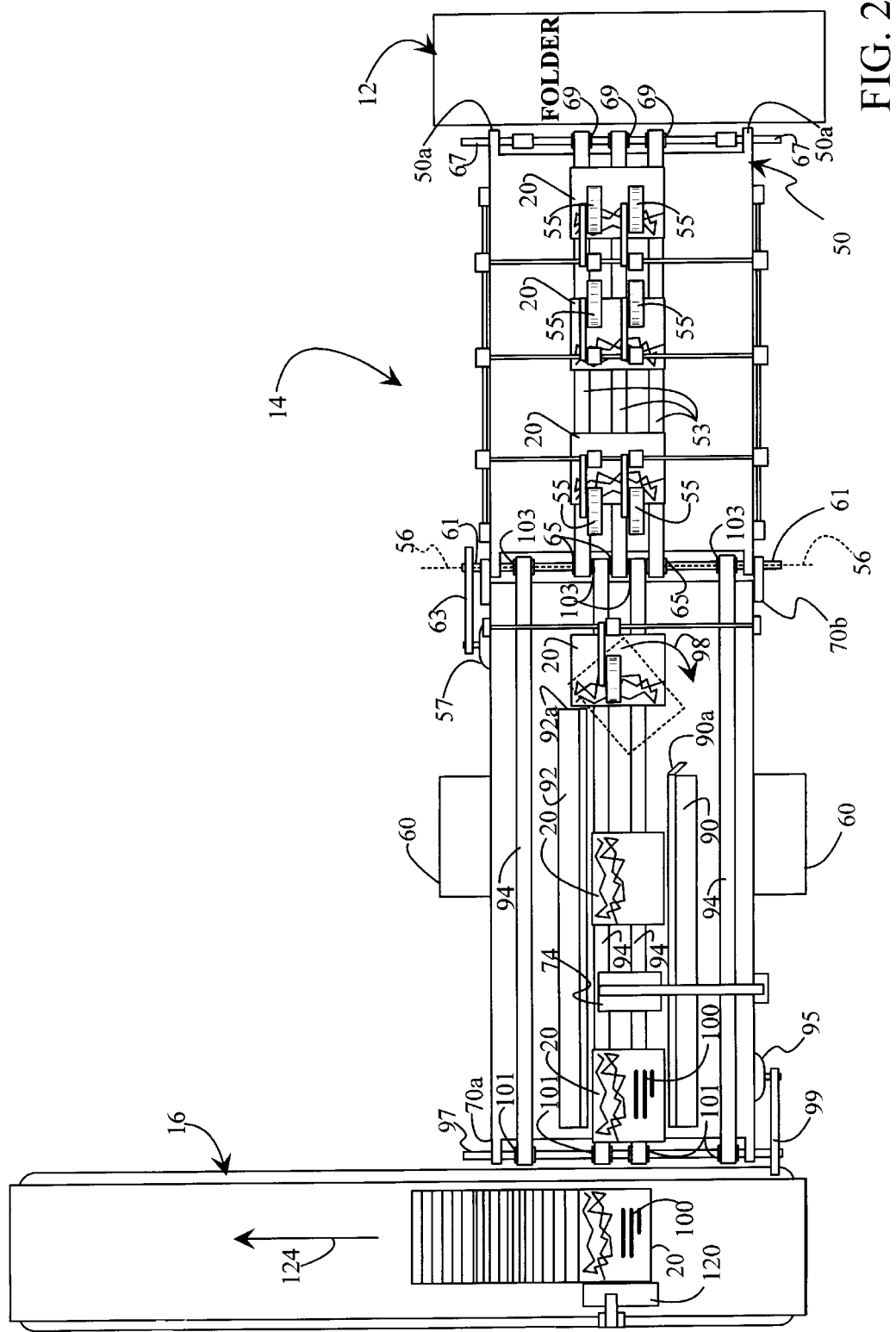
FIG. 2 is a top view of the system of FIG. 1 as taken along lines 2—2 of FIG. 1.

Often, the orientation of folded material 20, e.g., as provided by folder 12, mismatches that required by printer 74. Under such circumstance, a "bump turn" at transport station 14 rotates folded material 20 suitably, e.g., 90 degrees, for presentation to printer 74. As best viewed in FIG. 2, horizontal table 70 includes a left guide 90 and right guide 92. Each of guides 90 and 92 may be constructed from angle stock, i.e., two orthogonal panels with one panel resting flat on table 70 and the other panel vertically upright to provide a guide path for material 20 past printer 74. Guides 90 and 92 are adjustably positioned laterally relative to path 72 according to the width of folded material 20 as it passes by printer 74. The upstream end 92a of guide 92 first encounters, i.e., before end 90a of guide 90, folded material 20 as it moves along conveyor belts 94 of table 70. Upon encountering end 92a, folded material 20 rotates clockwise, as indicated at reference numeral 98 in FIG. 2, as belts 94 continue to propel folded material 20 along path 72 and between guides 90 and 92. As each item of material 20 passes printer 74, printer 74 applies an address 100 thereon.

Table 70 then propels the addressed folded material 20 onto collection conveyer 16. In the particular configuration shown, material 20 encounters a stop 120, lands uniformly on conveyer 16, and commences travel along path 124 as provided by conveyor 16. The speed of material 20 along path 124 is significantly less than the speed of material along path 72. Material 20 thereby accumulates on conveyor 16 in a uniform overlapped fashion.

Transport station 14 further includes a control panel 200 including an emergency shutdown switch 202, a table 70 speed control 204, and a table 50 speed control 206. Activation of emergency stop switch 202 cuts power to motors 95 and 57. Adjustment in speed control 204 varies the speed of motor 95, and thereby varies the speed of conveyor belts 94 and movement of material 20 along path 72 of table 70. Similarly, adjustment of speed control 206 varies the speed of motor 57 and belts 53 thereby varying the speed of material 20 along path 52 of table 50. As may be appreciated, an operator of station 14 adjusts the relative speed of tables 50 and 70 to accommodate a most productive overall operation. For example, the speed of material along path 72 of table 50 should exceed that of material along path 52 of table 50. In this manner, material 20 does not accumulate when moving from table 50 to table 70. The speed of table 50 should be adjusted to be greater than the material flow 22 whereby material 20 does not accumulate at the infeed table 50.

Thus, an integrated transport system has been shown and described. The subject matter of the present invention increases overall productivity and decreases associated labor costs in connection with preparing material for mass mailing. The present invention, being adaptable in height and speed of material flow, receives mass mailing material from a variety of sources. In prior mailer station configurations, just the mailer station alone requires three persons to support operation. Under the present invention, however, three persons manage not only the functions of a mailer station, but also a material source, e.g., folder 12, and the collection and sorting of material 20 into trays. One person feeding the folder, one person sorting the material as addressed, and one person placing material in trays as sorted, addressed mail. Furthermore, when operating multiple folding apparatus and multiple transport stations 14, a single person can run both folders, thereby further improving overall labor efficiency. Integrating the transport station 14 of the present invention intermediate a folder and a collection conveyor allows the station 14 to automatically transport the material 20 through the printer and onto the collection conveyor without significant operator assistance. Once the various controls and adjustments are set, station 14 runs substantially independently receiving a flow of material from a first and providing an outflow of material to a second device.

It will be appreciated that the present invention is not restricted to the particular embodiment that has been described and illustrated, and that variations may be made therein without departing from the scope of the invention as found in the appended claims and equivalents thereof.

What is claimed is:

1. A method of preparing mailing material for submission to a postal service, the method comprising:

providing by automation from a material source device a flow of mailing material ready for application of address information thereon;

receiving by automation said flow of mailing material directly from said material source and applying by automation address information thereon; and delivering by automation said addressed mailing material onto a collection conveyor for accumulation into mailing trays and delivery to said postal service as addressed mail.

2. A method according to claim 1 wherein said material source is a folder receiving flat stock printed material, applying at least one fold thereto, and providing said flow of mailing material ready for application of address information thereon.

3. A method according to claim 1 wherein said receiving and applying step includes intermediate said receiving step portion and said applying step portion rotation of said mailing material.

4. An integrated transport system comprising:
- a material source providing a flow of folded mailing material at a given height relative to a floor level;
- a transport station including an infeed conveyor, said infeed conveyor receiving said flow of folded mailing material, said station moving said material and providing said material as an outflow of said folded mailing material, said infeed conveyor operating at a first speed and said outflow operating at a second speed; and
- a collection conveyor receiving said outflow of said material.

5. An integrated transport system according to claim 4 wherein said second speed is greater than said first speed.

6. An integrated transport system comprising:
- a material source providing a flow of folded mailing material at a given height relative to a floor level;
- a transport station including an infeed conveyor, said infeed conveyor receiving said flow of folded mailing material, said station moving said material and providing said material as an outflow of said folded mailing material;
- a collection conveyor receiving said outflow of said material;
- a first electric motor; and
- a second electric motor, said first and second electric motors each including an associated manually adjusted speed control, said first motor being coupled to drive said infeed conveyor and said second motor being coupled to drive said outflow.

* * * * *